(12) United States Patent
Edwards et al.

(10) Patent No.: US 8,129,852 B2
(45) Date of Patent: Mar. 6, 2012

(54) WAVE AND WIND POWER GENERATION

(75) Inventors: James Ian Edwards, Banchory (GB); Peter Thomas Diver, Ballymena Co. Antrim (GB)

(73) Assignee: ITI Scotland Limited, Glasgow Strathclyde (GB)

( * ) Notice: Subject to any disclaimer, the term of this patent is extended or adjusted under 35 U.S.C. 154(b) by 384 days.

(21) Appl. No.: 12/311,527

(22) PCT Filed: Oct. 2, 2007

(86) PCT No.: PCT/GB2007/050603
§ 371 (c)(1),
(2), (4) Date: Apr. 2, 2009

(87) PCT Pub. No.: WO2008/044065
PCT Pub. Date: Apr. 17, 2008

(65) Prior Publication Data
US 2010/0025996 A1   Feb. 4, 2010

(30) Foreign Application Priority Data

Oct. 10, 2006   (GB) .................................. 0620038.0

(51) Int. Cl.
*F03D 9/00* (2006.01)
(52) U.S. Cl. ........................................... 290/44; 290/55
(58) Field of Classification Search .............. 290/42–44, 290/53–55
See application file for complete search history.

(56) References Cited

U.S. PATENT DOCUMENTS

| | | | | |
|---|---|---|---|---|
| 4,103,490 A | * | 8/1978 | Gorlov | 60/398 |
| 4,208,878 A | * | 6/1980 | Rainey | 60/496 |
| 4,883,411 A | * | 11/1989 | Windle | 417/331 |
| 7,735,317 B2 | * | 6/2010 | Welch, Jr. | 60/398 |
| 7,737,572 B2 | * | 6/2010 | Welch et al. | 290/53 |
| 2008/0001410 A1 | * | 1/2008 | Welch, Jr. | 290/53 |
| 2008/0197632 A1 | * | 8/2008 | Lin | 290/42 |
| 2008/0265581 A1 | * | 10/2008 | Welch et al. | 290/53 |

FOREIGN PATENT DOCUMENTS

| | | |
|---|---|---|
| EP | 0 053 458 | 9/1985 |
| GB | 2 082 687 | 3/1982 |
| GB | 2 325 964 | 12/1998 |
| GB | 2 365 385 | 2/2002 |

OTHER PUBLICATIONS

International Search Report for PCT/GB2007/050603 mailed Jul. 24, 2008.
Written Opinion of the International Searching Authority for PCT/GB2007/050603 mailed Jul. 24, 2008.

* cited by examiner

*Primary Examiner* — Thanh Lam
(74) *Attorney, Agent, or Firm* — Nixon & Vanderhye P.C.

(57) ABSTRACT

A wave and wind power generation system including a platform and one or more oscillating water columns (OWC's). Included is an airflow control mechanism, a controller and a motion sensor for detecting motion of the platform. Additionally, the controller controls the airflow control mechanism so as to at least partially arrest undesirable motion of the platform.

41 Claims, 7 Drawing Sheets

WAVE AND WIND POWER GENERATION

This application is the U.S. national phase of International Application No. PCT/GB2007/050603 filed 2 Oct. 2007 which designated the U.S. and claims priority to British Patent Application No. 0620038.0 filed 10 Oct. 2006, the entire contents of each of which are hereby incorporated by reference.

BACKGROUND OF THE INVENTION

1. Field of the Invention

The present invention relates to floating power generation systems and relates particularly but not exclusively to such systems having stabilization control.

2. Discussion of Prior Art

Offshore power generation which harnesses the power of the waves has the potential to become a major source of energy and has been the subject of much experimentation and development over the past forty or more years. Such systems harness the power of the waves either directly or indirectly and convert that energy into electricity which is then transported to shore for subsequent use. The oscillating water column (OWC) has become a very popular method of converting wave energy into electrical power, whether as a shore-based, bottom-mounted or floating device. Whilst there are many ways of harnessing the wave energy, virtually every OWC proposed or built in the last 20 years has one or more Wells turbines which are driven by the pressurised air escaping from or entering the column as the water rushes in and out thereof. The popularity of the OWC has a great deal to do with the convenience with which the Wells turbine converts bi-directional airflows between wave chamber and atmosphere into unidirectional bursts of torque in the coupling of the electrical generator. Moreover, during lulls in the sea or when the air velocity drops to zero during twice-per-wave flow reversal, the Wells turbine needs little power to stay rotating. Simpler Wells turbines employ a set of fixed pitch blades and whilst these provide a generally very positive contribution to the creation of electrical energy the range of wave, and therefore airflow, conditions over which a fixed blade Wells turbine operates with reasonable efficiency is severely limited by blade stall.

Typically, Wells turbines use symmetrical profile blades with their chords in the plane of rotation and often produce positive torque only for angles of incidence between 2 and 13 degrees. Below 2 degrees, in the low air velocity operating area, the lift component is too small to produce positive torque and the rotor tends to lose speed. At angles of incidence above 13 degrees the blade section stalls. The rapidly increasing drag forces dominate the less rapidly declining lift forces and efficiency is compromised. If, however, the blades are such as to be able to change pitch so as to prevent the angle of incidence exceeding some maximum angle, for example 8 degrees, then it would produce positive torque at all angles of incidence above 2 degrees and efficiency would improve.

In operation, the water level oscillates up and down within the water column as the crests and troughs of the waves pass through the water column. If this oscillating water level is made to take place in a structural column opened at both ends, the air column above the water oscillates in a similar manner and, thus, wave energy is thereby converted into low pressure, high volume air flow. Energy is then extracted from the moving air by a self-rectifying Wells turbine, in which rotation is unidirectional regardless in which axial direction air is flowing. In essence, the Wells turbine is essentially operated as a wind or aero turbine. The working interface is therefore between water and air, and air and rotor blades. The turbine reacts to the low pressure air stream which is far less destructive than directly absorbing the powerful impact force of sea waves. The efficiency of energy transfer between the wave and the air is high if not total whilst the energy transfer efficiency at the air/rotor blade is very much dependent upon good design and efficient management of the energy transfer itself.

In some arrangements it is known to use a flywheel to keep the turbine spinning by virtue of momentum during times when the waves are weak. It is also known to use two rotors in tandem configuration that rotate in opposite directions and are coupled to a common output. It is also known to use the variable-pitch turbine for performance-enhancing reactive loading by using the generator and turbine to pump bursts of energy into the wave chamber itself.

It is also well known to extract energy from the wind by causing the wind to drive a wind turbine which is, typically, mounted as high on the platform as possible so as to ensure it is exposed to the full force of the wind whilst being clear of any ground effect or interference created by the platform itself. Whilst such turbines are relatively efficient and are able to extract large amounts of energy from the wind, the higher efficiency turbines tend to have very large diameter blades and hence require very high platforms or towers upon which they can be safely mounted. On land this does not present a problem as the tower can be firmly secured to ground but the security of fixture is somewhat more problematic when mounted to a floating platform which is subjected to the motion of the waves. Any such motion causes the turbine to oscillate from a steady state condition and creates what can be adverse structural loadings on both the turbine and the support tower itself. Some water based wind turbine arrangements are operated to take advantage of the forward and backward motion caused by the waves interacting with the platform or floating column upon which it is mounted. In essence, forward motion creates an "apparent wind" to which the rotor blades are exposed and more energy can be extracted from the wind during any forward motion of the blades than can be extracted when the blades are either stationary or being rocked backwards. Whilst this additional energy extraction can be advantageous it has to be balanced against the structural loading on the support tower upon which the turbine is mounted and this can be undesirably high in stormy sea conditions and may lead to structural failure.

In addition to the above-mentioned problems, such platforms also suffer from adverse movement in up to six axes (roll, yaw, pitch, heave, sway and surge) whilst floating on what can be very choppy seas. Movement in any one or more axis will have an adverse affect on platform stability, structural loading and also power generation and is preferably reduced to a minimum in order to prolong platform life and energy extraction. Various systems have been proposed to stabilize the platform itself, one of which is discussed in EP 0053458 in which the column of water in an OWC is arrested and released subsequently in an attempt at synchronizing. Whilst the above arrangements provide very reasonable solutions the power generation or stability problems, maximizing power generation can sometimes be to the detriment of structural loading or stability whilst maximizing stability can have an adverse effect on power generation.

Yaw control is particularly important when attempting to stabilize a moored platform at sea and is not readily addressed by the above-mentioned arrangements. Often the waves are of such power, magnitude and direction as to sway the platform around on its moorings which are then placed under additional strain which can be substantial. When mooring lines are also provided they can exert a corrective force on the platform thus sending the platform into an oscillating motion which can be difficult to control and can sometimes be of a frequency that matches another external force which when combined with the yaw force places the platform under excessive load. Some platforms are designed to face into the oncoming waves and are shaped such as to provide a bow or other such feature but when such features are not present such platforms can become unstable in high sea states and this can also lead to severe strain being placed on the platform itself and any wind turbine structures placed thereon. This problem is exacerbated by wind/tide conditions which place the wind at an angle relative to the oncoming wave.

SUMMARY OF THE INVENTION

The present invention attempts to reduce the disadvantages associated with the above-discussed arrangements by providing a floatable platform which is stabilized relative to the sea by manipulation and control of the power extracting apparatus and which also attempts to increase the efficiency of power generation whilst stabilizing the platform.

Accordingly, the present invention provides a floatable platform comprising: a platform base; an oscillating water column; a motion sensor for determining the axial motion of said platform about one or more axes; a stabilisation controller; and an air flow control mechanism, for controlling the flow of air through the oscillating water column; wherein said axis sensor is operably connected to said stabilisation controller for transmitting axial motion data to said control and said control is operably connected to said airflow control mechanism for controlling the flow of air through said oscillating water column, thereby to at least partially stabilise said platform in one or more axes. The airflow control mechanism may comprise a flow (pressure) valve for controlling the flow of air through the column. Alternatively, said airflow control mechanism may comprise an air driven turbine and a control mechanism for controlling the back pressure created thereby within the column.

Advantageously, said platform is provided with two oscillating water columns, said oscillating water columns being positioned at opposite ends of said platform to each other and each being operably connected to said stabilisation controller for control thereby. Alternatively the platform may comprise a plurality of oscillating water columns along each of said ends.

Alternatively or additionally, the platform may comprise two or more oscillating water columns positioned at opposite sides of said platform to each other and each being operably connected to said stabilisation controller for control thereby.

Preferably, said displacement sensor comprises a multi-axis displacement sensor and monitors axial displacement in one or more of roll, pitch, yaw, heave, sway and surge of the platform.

Advantageously, said stabilisation controller includes a computer having a software program operable to control the stability of the platform in accordance with a pre-determined control strategy. Said controller may include a feed-back loop.

Advantageously, said water column or columns further include a surge prevention mechanism which in one arrangement comprises a floating ball and means defining a restricted orifice having a diameter smaller than said ball. In another arrangement the surge prevention mechanism comprises a floating plate having an external diameter and means defining a restricted orifice having a diameter smaller than that of said plate. In a still further arrangement said surge prevention mechanism comprises a sliding plate valve having an actuator and means defining an orifice over which said plate valve is slid by said actuator.

Preferably the platform further including a pressure sensor within one or more oscillating water columns, said pressure sensor being operably connected to said stability controller for delivering pressure data thereto. Said pressure sensor may include a sensor on each side of a wind turbine blade positioned therein, thereby to determine the pressure differential across the turbine.

Advantageously, the platform further including a water level sensor within one or more oscillating water columns, said level sensor being operably connected to said stability controller for delivering pressure data thereto.

Advantageously, said platform further includes a wave sensor for determining the height, direction and frequency of waves, said wave sensor being operably connected to said stability controller for delivering wave data thereto.

In one arrangement the platform includes a wind driven turbine and further including an RPM sensor for monitoring the speed of rotation thereof, said RPM sensor being operably connected to said stability controller for delivering rotational speed data thereto. When the platform includes a wind driven turbine it may further including a Voltage and Current sensor for monitoring voltage and current output of said generator, said sensor being operably connected to said stability controller for delivering Voltage and Current data thereto.

Preferably, said platform includes an excitation voltage controller for controlling the excitation voltage of said generator. Said controller is preferably operably coupled to said stability controller for control thereby.

Preferably, said platform includes a wind turbine and a tower upon which said turbine is mounted, said turbine having a variable pitch propeller and a rotational mount upon which said turbine is mounted for rotational movement about a longitudinal axis of said tower. There may also be provided a turbine yaw detector for detecting the angular position of the turbine relative to said tower, said yaw detector being operably connected to said stability controller for supplying yaw data to said controller. There may also be provided a yaw actuator for varying the yaw angle of the turbine relative to said tower, said yaw activator being operably connected to said stability controller for receiving actuation signals therefrom, thereby to vary the angular position of said wind turbine relative to said tower.

Advantageously, said platform includes a wind monitor for monitoring the direction and velocity of any wind approaching said platform, said wind monitor being operably connected to said stabilization controller for supplying wind data thereto. The platform may also include a pitch controller for controlling the pitch of said rotor blades, said pitch controller being operably connected to said stabilization controller for receiving control signals therefrom.

In one arrangement the platform further includes an anchor mechanism for anchoring said platform to an immovable object. said anchor mechanism preferably comprises three or more anchor lines secured at a first end to an immovable object and at an otherwise free end to a power generation apparatus. There may also be provided one or more cable tension monitors for monitoring the tension in one or more of said cables, said tension monitors being operably connected to said stabilization controller for supplying tension information thereto.

In addition to the above, the platform may include one or more cable length monitors for monitoring the length of one or more of said cables, said one or more cable length monitors being operably connected to said stabilization controller for supplying length data thereto.

The present invention also provides a control method for controlling a floatable platform having a platform base; one or more oscillating water columns; a displacement sensor for determining the axial displacement of said platform about one or more axes; a stabilisation controller; and an airflow control mechanism, for controlling the flow of air through the oscillating water column; the method comprising the steps of monitoring the axial displacement of said platform relative to one or more axes and controlling the flow of air through said oscillating water columns in response to detection of a deviation from a desired axial orientation of said platform, thereby to raise or lower a portion of said platform relative to the water upon which it is floating and at least reduce movement in one of more axis. Said airflow control mechanism may comprise a flow control valve and said method includes the step of controlling the flow of air through said one or more columns so as to cause a portion of said platform to rise or fall relative to an adjacent portion thereof. Alternatively or additionally, the airflow control mechanism comprises an air driven turbine generator wherein control thereof comprises the steps of controlling the backpressure created thereby within the column. When said airflow control mechanism comprises a flow control valve and an air driven turbine generator the method may include the step of controlling the flow of air through said one or more columns and the backpressure created by the turbine so as to cause a portion of said platform to rise or fall relative to an adjacent portion thereof. When said platform is provided with one or more horizontally extending water columns said method may further includes the step of controlling the flow of air through the water column for controlling the platform in one or more of sway or surge. When said platform includes a wind turbine having a yaw control mechanism said method may include the step of controlling one or more of the pitch and the yaw angle of the wind turbine blades so as to correct for yaw motion of the platform. When said platform includes one or more cable anchors having power generators attached thereto said method may include the step of controlling the paying in and paying out of said anchor lines thereby to control the platform in one or more of yaw, sway and surge.

The method may include the step of altering the pitch and/or excitation voltage of the air driven turbine within the oscillating water column in accordance with a given control methodology.

The method may also include the step of altering one or more of the wind turbine rotor blade pitch and/or excitation voltage of the wind turbine generator in accordance with a given control methodology.

When said platform includes a computer having a software programme having a control algorithm said method may include the step of controlling one or more of the air pressure within one or more oscillating water columns, the yaw and pitch angle of one or more blades of a wind turbine and/or the paying in and paying out of one or more anchor lines.

BRIEF DESCRIPTION OF THE FIGURES

The present invention will now be more particularly described by way of example only with reference to the accompanying drawings, in which.

DETAILED DISCUSSION OF EMBODIMENTS

Figure 1:
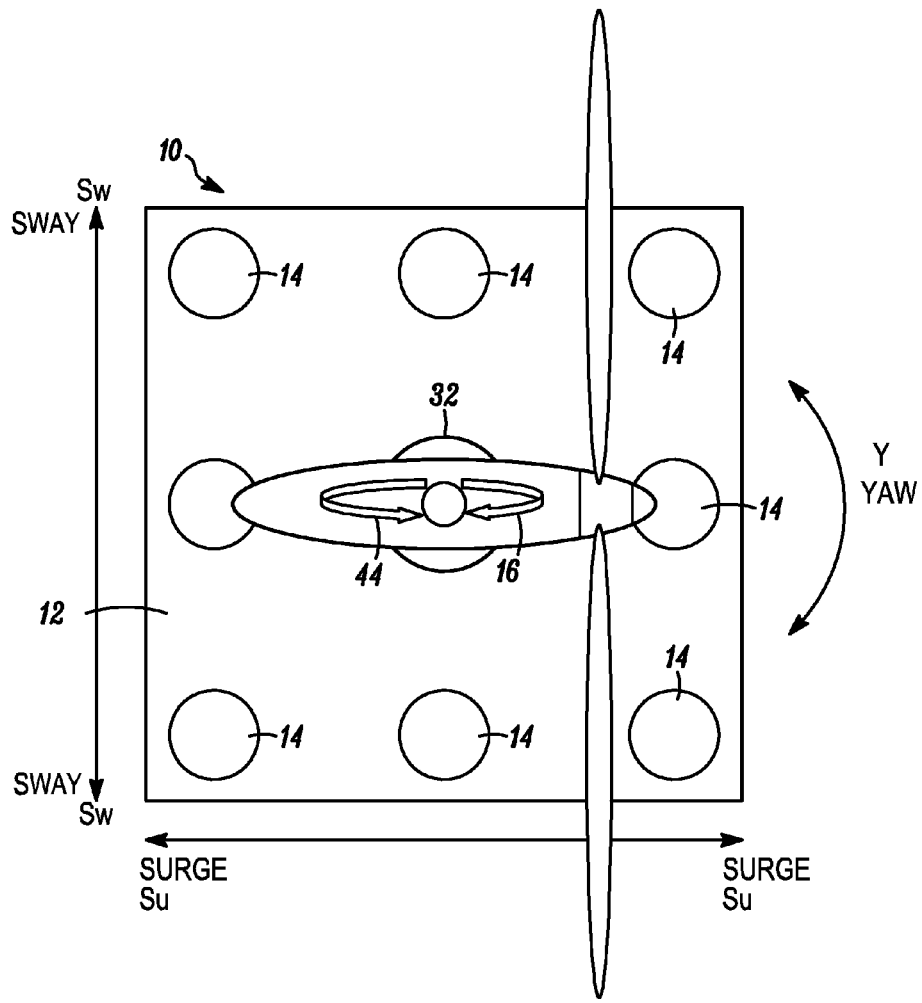
FIG. 1 is a plan view of a platform according to the present invention and illustrating the juxtaposition of the wind turbine and the water columns.
Figure 2:
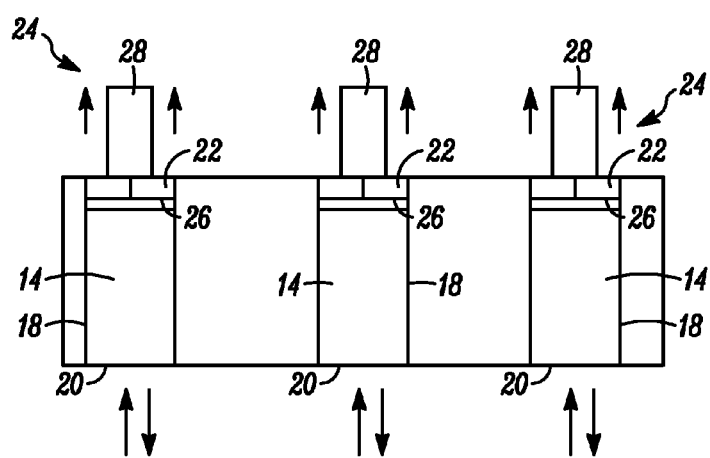
FIG. 2 is a cross sectional view in the direction of arrows A-A in FIG. 1 and better illustrates the association between the water columns and power generation systems associated therewith.
Figure 3:
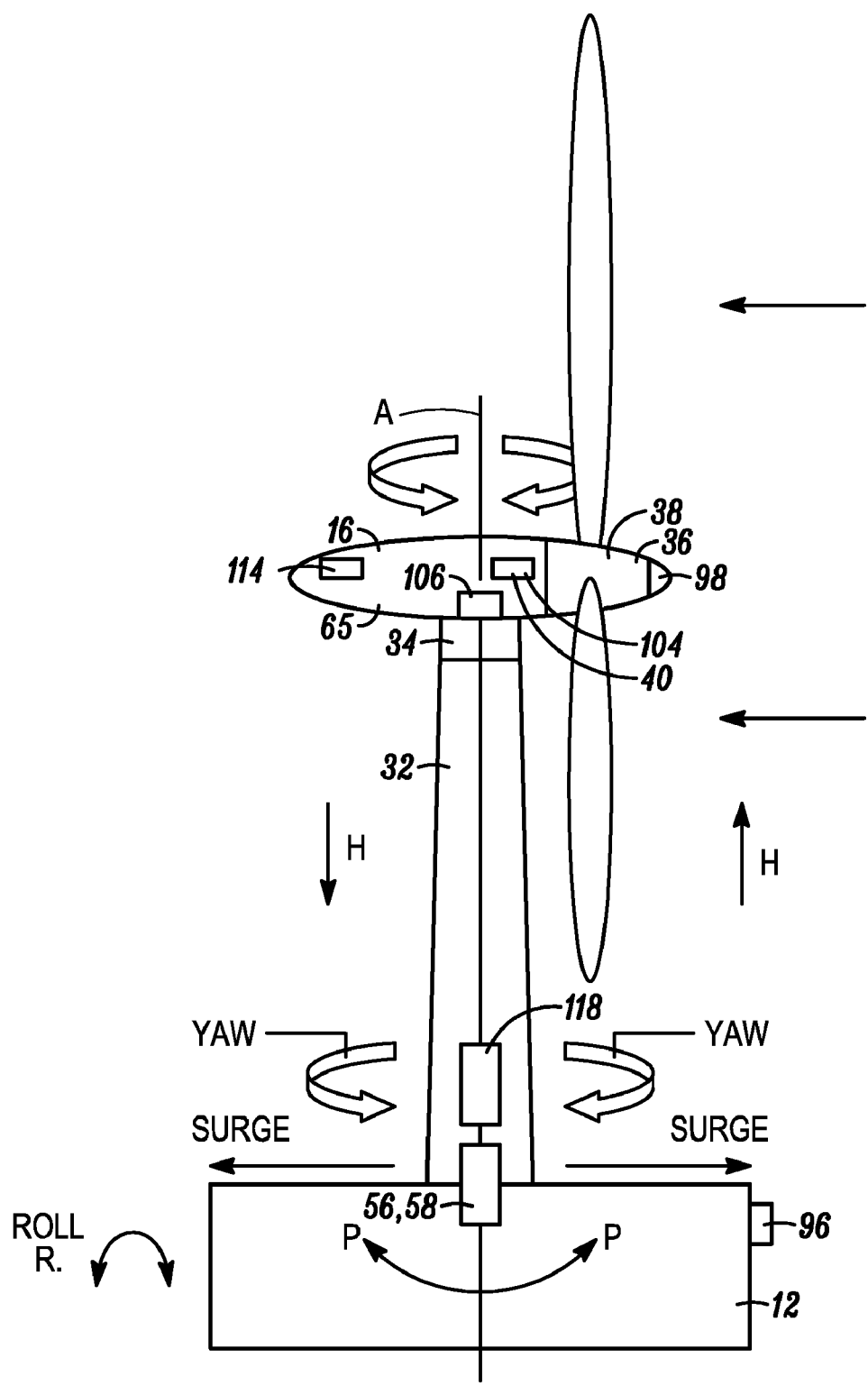
FIG. 3 is a side elevation of the platform shown in FIG. 1 and illustrates various degrees of movement thereof.
Figure 4:
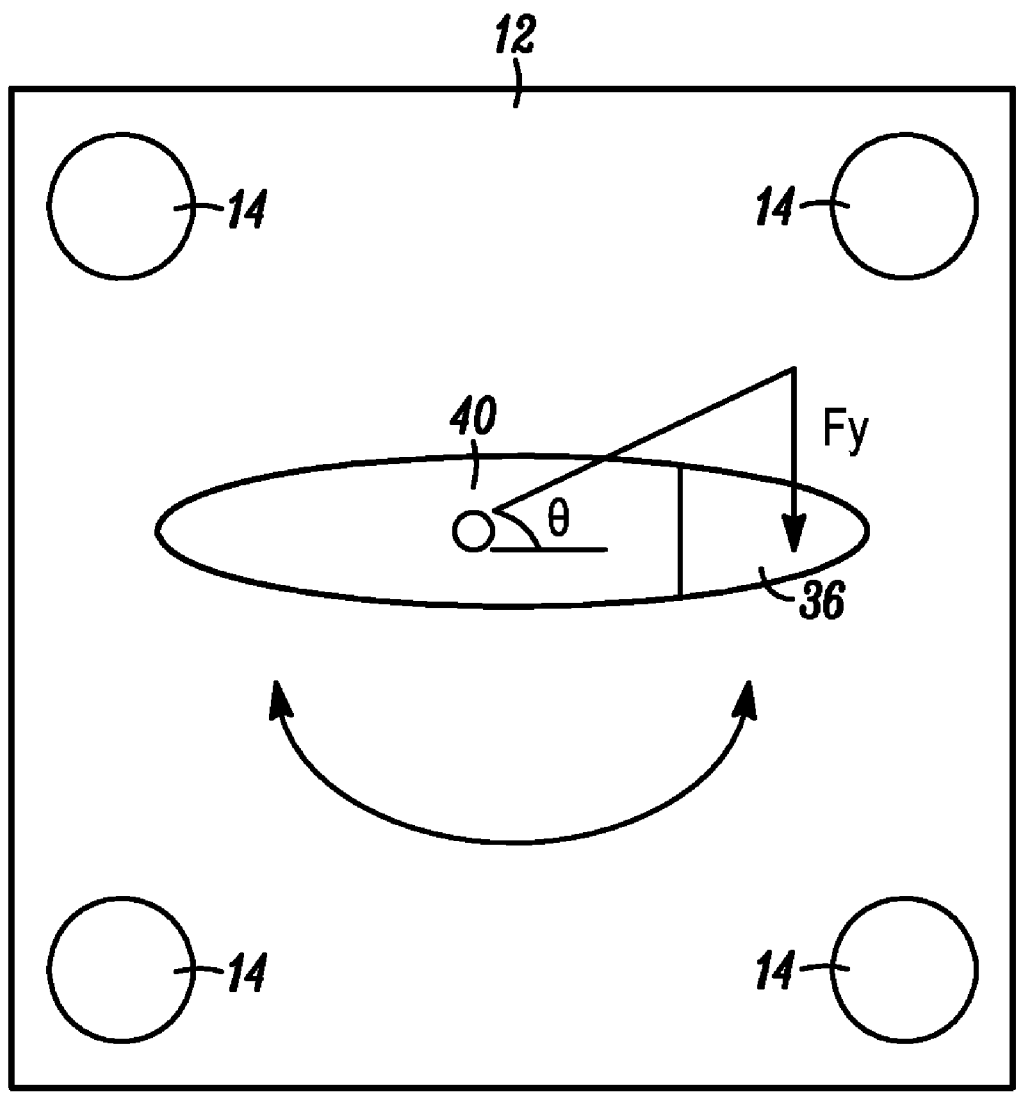
FIG. 4 is a plan view of the tower and wind turbine arrangement and illustrates the corrective loading reaction force that can be applied to correct for platform yaw.

Referring now to the drawings in general but particularly to FIG. 1, it will be appreciated that a platform 10 according to the present invention comprises a base 12 within which may be provided a plurality of oscillating water columns (OWC's) shown diagrammatically at 14 and upon which may be provided a wind turbine shown generally at 16 and being rotatable about axis A. In various arrangements one or more or both of the OWC's and wind turbine may be provided. When floating on water and exposed to the motion of the waves and other influences the platform can move about three axis in one or more of six ways (pitch, roll, yaw, sway, surge and heave), all of which are discussed in detail later herein but each of which are marked with appropriate arrows (P, R, Y, Sw, Su and H) throughout the drawings. The OWC's may be provided in the singular, matched pairs at opposite extremities of the platform or in multiples thereof positioned at appropriate positions within the platform depending upon the function to which they are to be allocated. As discussed above, OWC's are well known for use in generating power from the motion of waves passing under such platforms. Such columns generally comprise an axially extending tube 18 exposed at one end 20 to the water beneath the platform and having at an otherwise free end 22 an air powered turbine generator system often provided in the form of, for example, a Wells turbine 24. Such turbines have a fixed or a variable pitch rotor 26 and are "bi-directional" in that the generator portion thereof 28 turns in the same direction regardless of the direction of the rotor portion 26. Such turbines lend themselves well to use in OWC's as an air column positioned above the water column within the tube 18 is forced up and down past the turbine blades as the level of water rises and falls with the passing waves and this motion turns the blades in opposite directions. The wind turbine portion of the arrangement 16 is generally mounted on a tower 32 best seen in FIG. 3 and includes a drive mechanism 34 for altering the angular position θ (FIG. 4) or direction of the rotor blade 36 relative to the platform base 12 and this is normally used to position the rotor directly into wind so as to capture the maximum amount of wind energy. Such wind turbines also include a variable pitch propeller arrangement 38 and a control system 40 for altering the pitch thereof.

Thusfar, we have described a conventional OWC and wind turbine arrangement. The present invention improves on the above-arrangements in a number of ways, each of which will be discussed in detail below.

One of the first improvements that the present invention provides is the form of stabilization of the platform within which the OSC's are positioned. In this context the present arrangement is provided with an air flow control mechanism 50 which, in one arrangement, comprises an airflow control valve 52 (FIG. 5) and in another arrangement comprises a system 54 for controlling the pressure drop across the air driven turbine blades 26, both of which will be described in detail later herein. The airflow control mechanism 32 is operated and controlled from a computer 56 having a software programme 58 including an algorithm 60 for reactive or adaptive control of the control mechanism according to a predetermined control strategy or an adaptive control strategy, each of which are also described in more detail later herein. The airflow control mechanism is controlled in order to control the flow of air through the OWC's and thus control the stability of the platform in one or more of Pitch, Roll, Surge and Sway. Control of yaw is facilitated by altering the angle of the wind turbine 16 relative to the platform base 12, again as will be described further later herein. An additional control function can be implemented to control or further control the pitch of the platform 12 by altering the pitch angle of the rotor blades of the wind turbine 16 or altering the electrical load on the generator 64 associated therewith. Again, this control is implemented via the computer and will be described in more detail later herein.

Figure 7:
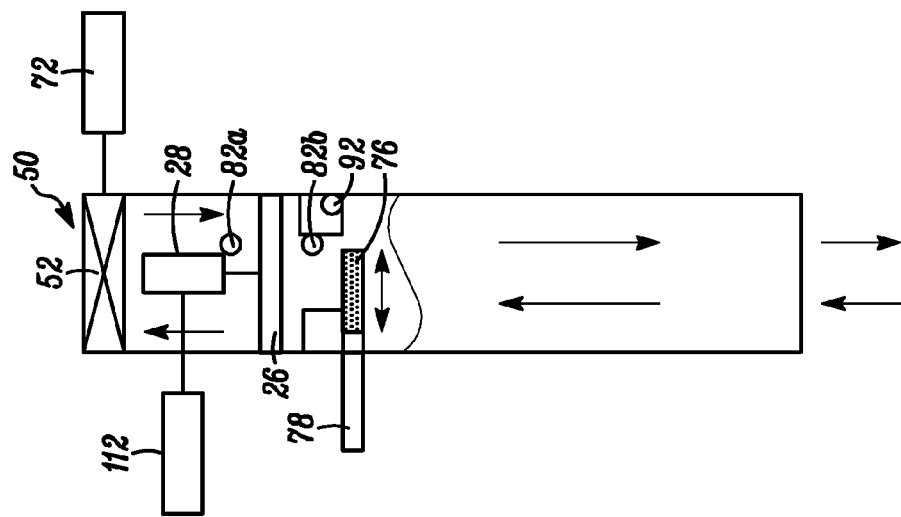
FIGS. 5 to 7 illustrate in more detail three alternative oscillating water column arrangements.
Figure 6:
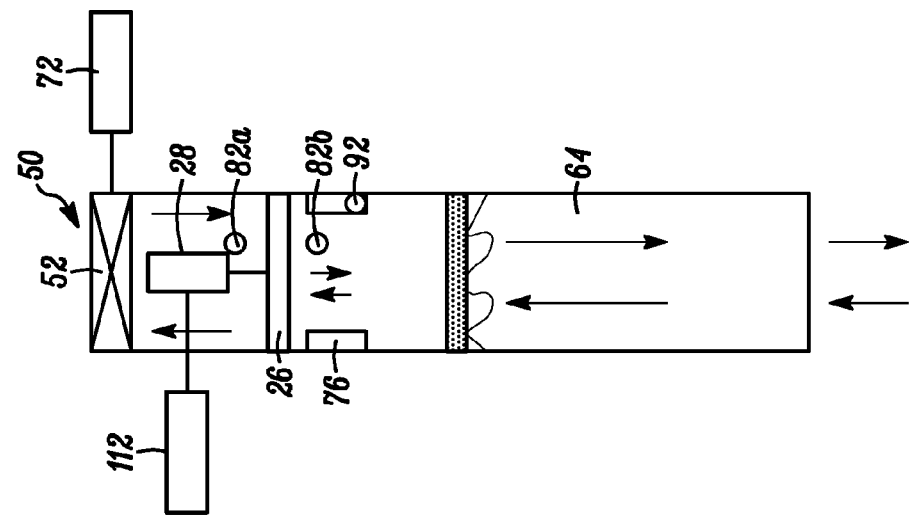
Figure 5:
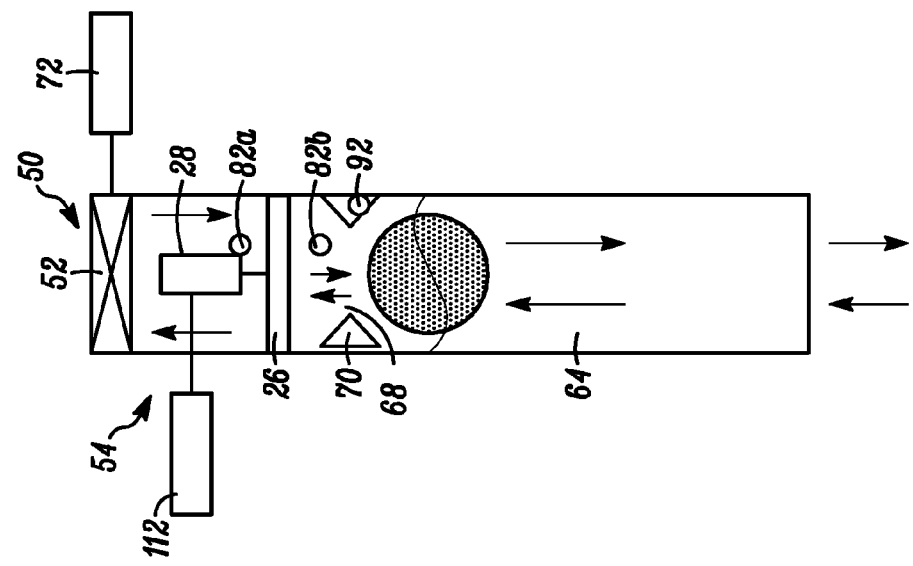

Referring now to FIGS. 5 to 7 from which it can be seen that the OWC's can be provided in a number of different forms. The example of FIG. 5 illustrates an arrangement in which the water column 64 supports a floating ball 66 which, in operation, is driven up and down the column as the water rises and falls in accordance with the height of any passing wave. Positioned towards the top of the column is a restrictive orifice 68 formed by projections 70 shaped and positioned such as to prevent the ball 66 passing therethrough. In the event of the water column rising too far up the chamber the ball closes off the orifice and prevents water from entering the turbine blade section in which it can cause overloading of said blades and damage to them and the generator system through shock loading. Towards the top of the column is an airflow control valve 52 linked for control thereof to actuator 72 which is, in turn, linked to controller 56 for operation as described later. An alternative arrangement is shown in FIG. 6 in which the floating ball 66 is replaced by a floating plate valve 74 and projections 76 which form a restrictive orifice 54 through which said plate valve 60 can not pass. Operation is as described above and is not, therefore repeated herein. Whilst not necessary in all applications, the arrangement may also include an airflow control valve 52 and actuator as described above. A third arrangement is illustrated in FIG. 7 in which a sliding plate valve 76 and actuator 78 are employed to obviate orifice 54 defined by restricting projections 80. Again, valve 52 and actuator 72 may be employed if so desired. Shown in each of drawings 5 to 7 are pressure sensors 82 for sensing the air pressure within the column. Such sensors may be provided in pairs 82a, 82b on either side of the rotor blades 26 so as to determine the pressure drop thereacross. Each pressure sensor is operably connected via line 90 to the stability controller 56 for delivering pressure data thereto. Within each OWC there is also provided a water level sensor 92, each of which is also operably connected via line 94 to controller 56 for delivering water level data thereto. Other sensors provided within the system include a wave sensor 96 (FIG. 3) for monitoring the frequency and height of incoming waves and a wind sensor 98 for determining the wind speed, variation and direction. Each of these sensors are connected by lines 100, 102 to said controller for providing wave and wind data thereto. The wind turbine 16 is provided with an RPM sensor 104 and an angular position sensor 106 for determining the speed of rotation of the rotor blade and the angular position of the rotor relative to the base portion 16. Again, each of these sensors is connected to the controller 56 via lines 112, 114 (FIG. 9) for providing data thereto. Each of the air driven generators 28 within the OWC's and the wind turbine 16 are provided with Voltage and Current monitors and controllers shown schematically at 116 and 118 respectively and being linked by lines 96 and 98 respectively for transmitting Voltage and Current data thereto and for receiving control signals therefrom for controlling the generators themselves. Each controller 112, 114 is preferably configured to control the excitation voltage of each generator.

The skilled reader will appreciate that the OWC's may be provided in the singular, in pairs, around the periphery of a platform, along one or more edges, within the core of the platform or any combination thereof. Additionally, the OWC's may be operated individually, in pairs or in groups so as to assist with the stabilisation/power generation requirements. When operating in pairs, it has been found that operation (control) of pairs placed diametrically opposite to each other is advantageous as the OWC's can be used in a "cross-linked" manner allowing date from one OWC to be used when controlling another or two OWC's to be controlled based on data from two or more OWC's or other sensors. Other arrangements will present themselves to those skilled in the art and throughout the present description reference to single OWC's should be considered as a reference to one or more such devices.

Central to the control system described above is a motion sensor 118 of FIG. 3 able to detect motion in the form of displacement, acceleration or movement in or about any one of one or more axes X, Y, Z so as to determine the degree of pitch, roll, yaw, sway, surge and heave as and when necessary in order to provide the controller 56 with motion data for subsequent use in control processes. Such devices are well known in the art and are, therefore, not described further herein save to say they may comprise a simple solid state device sensitive to motion or acceleration in any one of one or more axes and generally provide a digital or analogue output proportional to the measured motion which may be transferred to the controller 56 in the usual manner. Preferably, the sensor 118 is positioned close to the centre of the platform base 12 so as not to experience excessive motions but it may be positioned anywhere on the platform or even the tower 32 itself.

Figure 8:
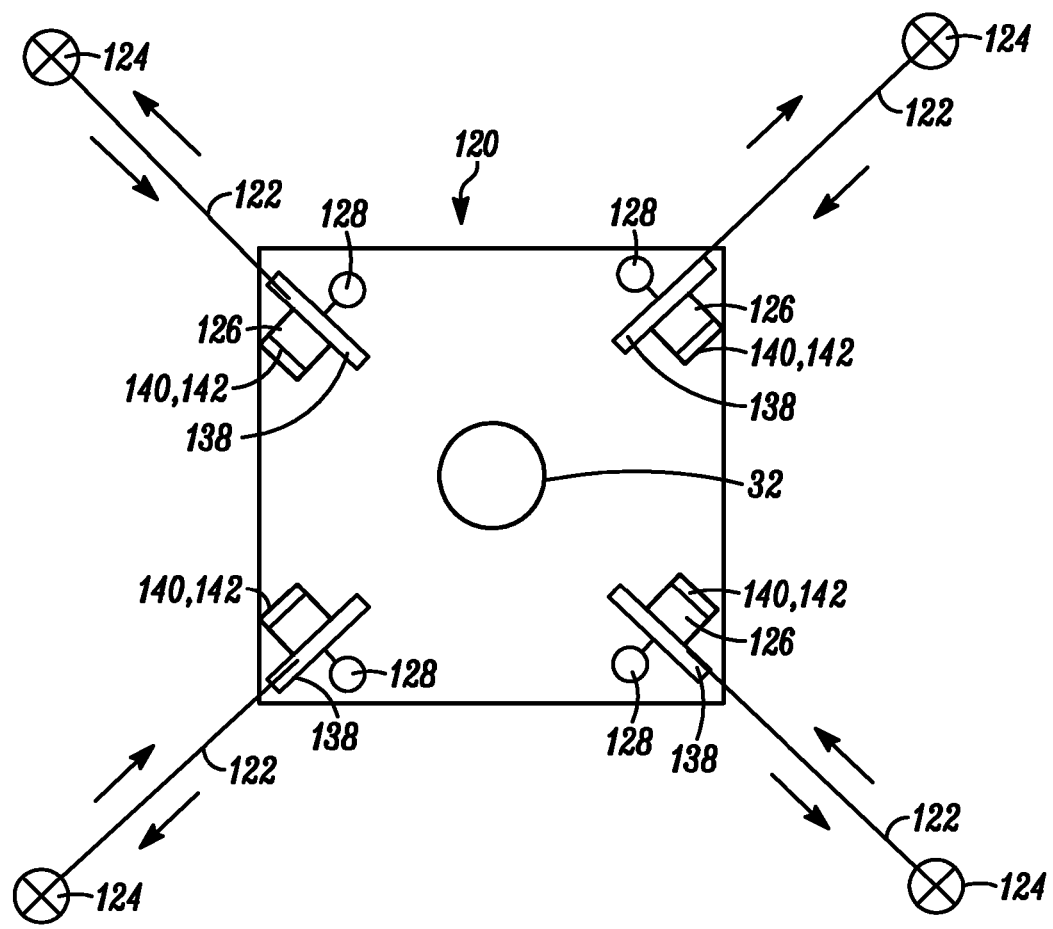
FIG. 8 is a plan view of the platform and illustrates an arrangement for stabilising the platform relative to a more secure structure, such as the seabed.
Figure 9:
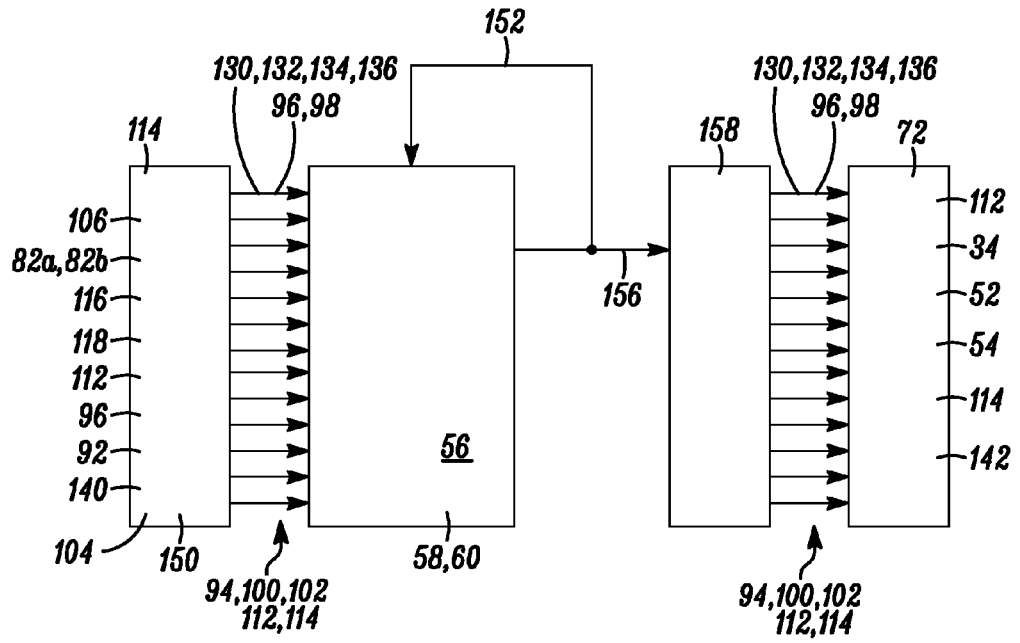
FIG. 9 is a diagrammatic representation of a control system used in the above-mentioned arrangements.

The readers attention is now drawn to one final stability/power generation arrangement of the present invention which is shown in FIG. 8 in which the base 12 is provided with an anchor mechanism shown generally at 120 comprising three or more anchor lines 122 secured at a first end to an immovable object 124 such as the sea bed and at an otherwise free end to a power generation device 126 which will be described in more detail shortly. The arrangement is provided with a tension monitor 128 for monitoring the tension in each line and this data is fed to controller 56 by data lines 130 to 136 (FIG. 9). The generator 126 provides an anchor point for the line and a drum 138 located on the shaft of said generator acts to store an amount of line and accommodate "paying in" and "paying out" of said line as and when required. The generators each includes a Voltage and Current monitor 140 and controller 142 for monitoring the Voltage and Current and for controlling the generator in the manner described above in relation to the wind and OWC generators. Data and instructions may be provided to the controller 56 and received therefrom via lines 130 to 136. It will be appreciated that as the platform moves in synch with any wave or wind force acting thereon the cables will wind on and off the drums thus causing the drum to rotate and turn the generator with it and thus generate electrical power. The amount of power generated will vary depending upon the control of the generator and the amount of tension the individual lines experience. The electrical load may be altered or controlled as described above in order to maintain a given tension on the line (and hence platform stability) or may be used to control the tension and platform stability within given tolerances.

The reader's attention is now drawn to FIG. 9 which illustrates the control system that may be employed with the arrangement described herein. It should be noted that one or more of such control systems may be employed and said control systems may be employed to operate in parallel, in which case they are each provided with all inputs and control outputs and act as back-up systems to each other. Alternatively, each of multiple control systems may be employed to control one or more movement of the platform. One arrangement is a singular control system may be provided for yaw control whilst a further may be provided for platform stability. Referring now more particularly to FIG. 9, it will be appreciated that the multiple inputs from each of the sensors or detectors 82, 92, 96, 104, 106, 112, 114, 116, 118 and 140 are fed via lines 94, 96, 98, 100, 102, 112, 114, 130, 132, 134 and 136 to controller 56 having a software programme 58 including (if desired) an algorithm 60 for reactive or adaptive control of said platform. A multiplexer or other such device 150 may be employed to combine the signals or inputs. The controller operation is described in detail in other portions of this document so is not further described here save to say that it may employ a feedback control loop shown schematically by arrow 152. Once the input date has been analysed and considered by the controller a control output is provided via line 156 to signal processor 158 (if desired) and then to data/control lines before being supplied to the various controllable elements for control thereof so as to control the platform within the desired set control limits.

Figure 10:
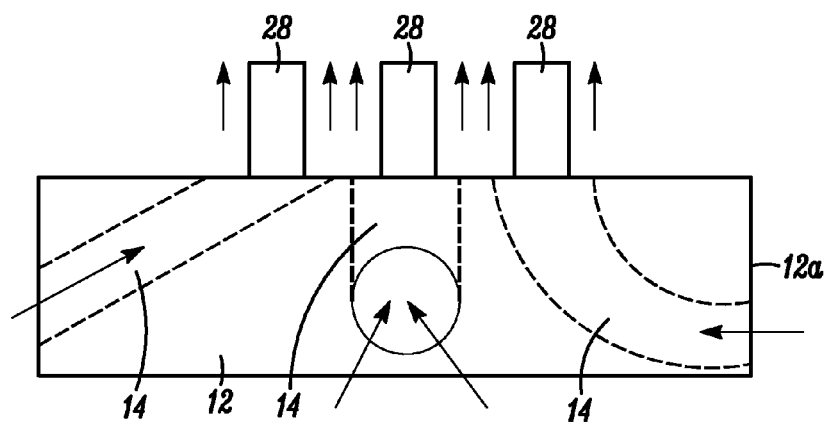
FIG. 10 is a further cross sectional view of the platform of FIGS. 1 to 3 and illustrates various options for the positional relationship of the water column and the turbines positioned thereon.

FIG. 10 shows slightly different arrangements of the OWC in which the column exit is positioned at the edge of the platform 12a rather than the base thereof. Such arrangements allow for the use of side impact of any waves in the generation of power/for stabilisation control. The column 18a is shown as a straight column angled relative to the edge whilst column 18b is a smooth curve arrangement.

Figure 11:
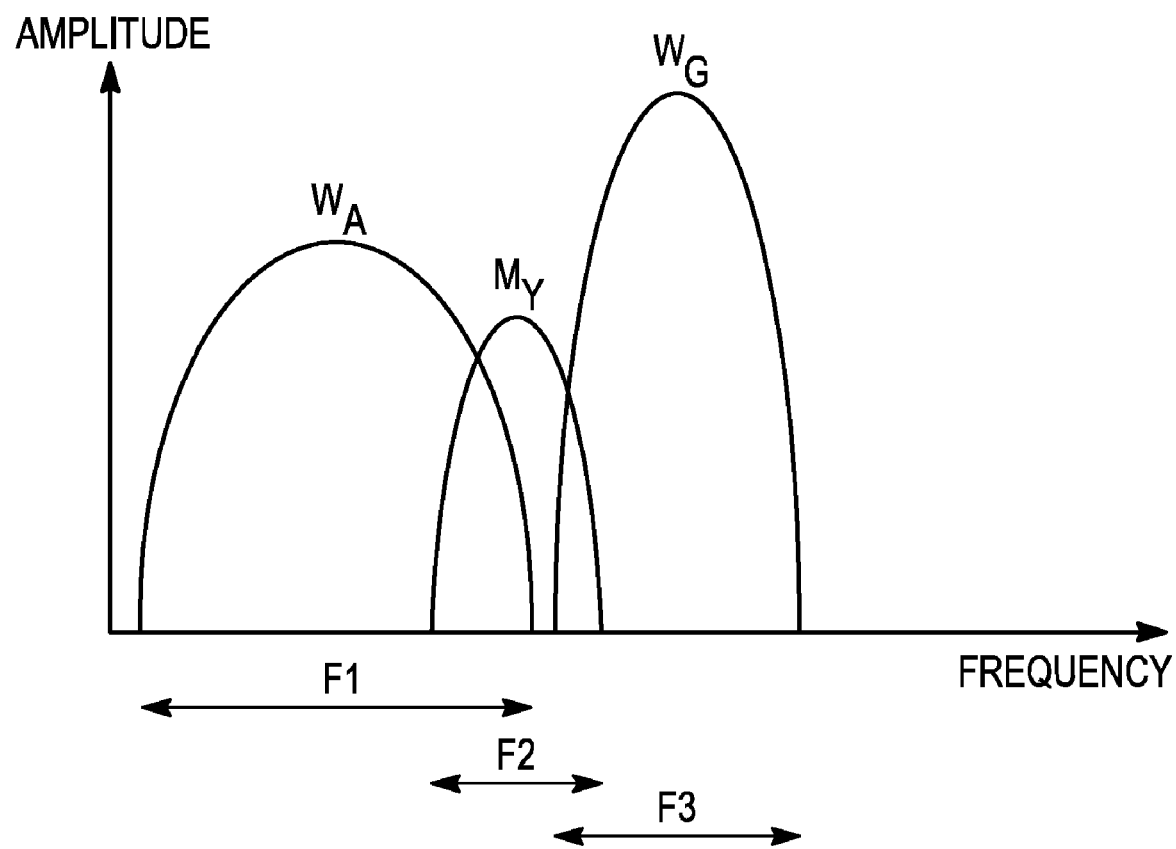
FIG. 11 is a graph of oscillation frequencies.

Referring now to FIG. 11 which is a graphical representation of a number of the various forces that the platform will experience, it will be appreciated that the magnitude and direction of the forces, loads and motions discussed above may vary and may act in phase or out of phase with each other. For reasons of clarity we illustrate just three forces namely wave force $W_A$ mooring yaw force $M_Y$ and wind gust force $W_G$ although any one of the forces monitored by the various sensors may be incorporated into the system. Each of these forces will have a frequency ($F_1$, $F_2$ and $F_3$) which might remain substantially constant in the case of wave frequency or may vary dramatically in the case of wind gust frequency. In practice it is possible for the various forces to combine together in certain circumstances and, if so, the resultant force can be greater than the design maximum allowed for the structure or stability requirements and must be avoided. The magnitude, frequency ($F_1$ to $F_3$) and rate of change of each force is fed to the controller 56 and analysed thereby and the magnitude, rate and displacement from a given stable position determined for any given moment in time. The controller has a primary responsibility to maintain the stability of the platform within given boundaries but whilst doing so also operates to maximise or at least optimise the combination of stability and power generation. There are some degrees of motion that are best eliminated in order to maximise stability and power generation and other degrees of motion that may be accommodated as they are within the design or stability tolerances of the platform itself. One of the functions of the controller 56 is to receive all the motion and force data and cause initiation of stabilization control according to a predetermined set of rules or an adaptively learnt set of rules stored within a look up table or memory, written into an algorithm or otherwise available to the controller. Of particular importance is the provision of a monitoring function which monitors each of the forces and initiates control as and when necessary in order to avoid the combined effect of multiple external forces. In this arrangement control to dampen down movement in one or more directions is initiated in a predictive manner so as to avoid excessive loading created by the combined forces. Such a "predictive" system would assist with the elimination of frequencies of forces which might combine together to create a frequency matching that of the resonant frequency of the platform or structure itself. Various limits may be selected so as to define an "envelope" of operation. One such limit might be the maximum acceleration of the wind turbine at the top of the mast as any excessive acceleration could place unacceptable loads on the tower and turbine itself. Another might be the maximum angle of pitch or rate of pitch change whilst a still further limit would be the maximum degree of roll and roll rate. Indeed, each and every one of Pitch, Roll, Sway, Yaw, Surge and Heave may have a maximum value and a maximum rate of change that is incorporated in the system so as to define the "envelope" of control parameters. When maximum platform stability is required one need only to alter the control criteria so as to limit the degree of movement from a relatively flat and stable position upon the sea so as to ensure corrective stabilization action is taken whenever necessary. In some other arrangements it may well be acceptable to allow a higher degree of motion and, indeed, one can in some instances make very good use of such motion. One example would be the pitching of the platform forwards and backwards into and out of the wind driving the wind turbine. One can extract more energy from the wind as the turbine and blades pitch forward as the blades themselves experience both the real and the apparent wind which, in combination, provide a higher energy opportunity. If the pitch of the blades or the loading on the turbine generator is altered accordingly, the blades will not only extract more energy from the wind but they will also provide more resistance to the wind and this can be used as a reactive force helping balance or stabilise the platform itself. Such control is of particular advantage when trying to extract maximum energy from the wind whilst accepting less stabilization of the platform. The control of air through the OWC's can also be used to stabilise the platform and/or optimise power or indeed maintain stability within acceptable limits whilst optimising power generation. In operation the air control valve or the pressure drop across the turbine blades is controlled to increase or decrease the air pressure within any associated column such as to cause the portion of the platform adjacent thereto to rise or fall relative to adjacent portions of the platform by virtue of the upward force created by the air pressure itself. When the side entry OWC arrangements of FIG. 10 are employed these may be employed to good effect to control both sway and surge as water entering these columns will be used to generate power as opposed to reacting against the side of the platform and inducing sway or surge motion.

Another area of stability control resides in Yaw control. Whilst this may be achieved by prudent control of the anchoring cables and generators associated therewith, it may also be achieved by altering the angular relationship between the wind turbine and the tower/base upon which it is mounted. In this aspect the yaw sensor is used to detect yaw of the platform and an output is fed to the controller which operates according to the pre-defined or adaptive control provided therein to initiate control over drive mechanism 34. The mechanism is actuated so as to angle the rotor at an angle θ and create a sideways force Fy (FIG. 4) which acts to sway the platform around its vertical axis A so as to correct any detected yaw in the platform. This control may be provided independently of any other control or in combination therewith and is preferably operated dependent upon data received from more than just the yaw sensor so as to allow for "intelligent" control which accommodates movement or alterations happening in other directions other than yaw and accommodates or controls according to predicted movements that can be predicted by, for example, monitoring changes in wind or wave conditions.

From the above discussion it will be appreciated that each of the controllable elements of this arrangement (OWC's, wind turbine and cable anchors) may be operated either independently or in combination with one or more of the remainder. Indeed, the controller 56 itself being in receipt of all the motion, wave, wind, electrical load, RPM and other information may employ this data to good effect to control one or more of the controllable elements in order to maximise stability in preference to power generation, maximise power generation whilst keeping stability and mechanical loads within accepted limits or some compromise between these two limits. Additionally, as a number of the controllable elements will, when controlled, have an affect on more than just one motion, each may be used in combination to tackle individual or compound motions.

The invention claimed is:

1. A floatable platform comprising:
   a platform base;
   an oscillating water column;
   a motion sensor for determining the axial motion of said platform about one or more axes;
   a stabilisation controller; and
   an air flow control mechanism, for controlling the flow of air through the oscillating water column; wherein said axis sensor is operably connected to said stabilisation controller for transmitting axial motion data to said control and said control is operably connected to said airflow control mechanism for controlling the flow of air through said oscillating water column, thereby to at least partially stabilise said platform in one or more axes and wherein said airflow control mechanism comprises a flow (pressure) valve for controlling the flow of air through the column.

2. A platform as claimed in claim 1 wherein said airflow control mechanism comprises an air driven turbine and a control mechanism for controlling the back pressure created thereby within the column.

3. A platform as claimed in claim 1 and having two oscillating water columns, said oscillating water columns positioned at opposite ends of said platform to each other and each being operably connected to said stabilisation controller for control thereby, said oscillating water columns being positioned at opposite ends of said platform to each other and each being operably connected to said stabilisation controller for control thereby.

4. A platform as claimed in claim 1 and comprising a plurality of oscillating water columns along each of said ends.

5. A platform as claimed in claim 1 and having two oscillating water columns, said oscillating water columns positioned at opposite sides of said platform to each other and each being operably connected to said stabilisation controller for control thereby.

6. A platform as claimed in claim 1 and comprising a plurality of oscillating water columns along each of said sides, said oscillating water columns being positioned at opposite sides of said platform to each other and each being operably connected to said stabilisation controller for control thereby.

7. A platform as claimed in claim 1 wherein said displacement sensor comprises a multi-axis displacement sensor.

8. A platform as claimed in claim 1 wherein said multi-axis displacement sensor monitors axial displacement in one or more of roll, pitch, yaw, heave, sway and surge of the platform.

9. A platform as claimed in claim 1 wherein said stabilisation controller includes a computer having a software program operable to control the stability of the platform in accordance with a pre-determined control strategy.

10. A platform as claimed in claim 1 wherein said stabilisation controller includes a feedback control.

11. A platform as claimed in claim 1 wherein said water column or columns further include a surge prevention mechanism.

12. A platform as claimed in claim 11 wherein said surge prevention mechanism comprises a floating ball and means defining a restricted orifice having a diameter smaller than said ball.

13. A platform as claimed in claim 11 wherein said surge prevention mechanism comprises a floating plate having an external diameter and means defining a restricted orifice having a diameter smaller than that of said plate.

14. A platform as claimed in claim 11 wherein said surge prevention mechanism comprises a sliding plate valve having an actuator and means defining an orifice over which said plate valve is slid by said actuator.

15. A platform as claimed in claim 1 and further including a pressure sensor within one or more oscillating water columns, said pressure sensor being operably connected to said stability controller for delivering pressure data thereto.

16. A platform as claimed in claim 15 wherein said pressure sensor includes a sensor on each side of a wind turbine blade positioned therein, thereby to determine the pressure differential across the turbine.

17. A platform as claimed in claim 1 and further including a water level sensor within one or more oscillating water columns, said level sensor being operably connected to said stability controller for delivering pressure data thereto.

18. A platform as claimed in claim 1 and further including a wave sensor for determining the height, direction and frequency of waves, said wave sensor being operably connected to said stability controller for delivering wave data thereto.

19. A platform as claimed in claim 1 including a wind driven turbine and further including an RPM sensor for monitoring the speed of rotation thereof, said RPM sensor being operably connected to said stability controller for delivering rotational speed data thereto.

20. A platform as claimed in claim 1 including a wind driven turbine and further including a Voltage and Current sensor for monitoring Voltage and Current output of said generator, said sensor being operably connected to said stability controller for delivering Voltage and Current data thereto.

21. A platform as claimed in claim 1 and having a wind driven generator and including an excitation voltage controller for controlling the excitation voltage of said generator.

22. A platform as claimed in claim 1 and having a wind driven generator and including an excitation voltage controller for controlling the excitation voltage of said generator wherein said excitation voltage controller is operably coupled to said stability controller for control thereby.

23. A platform as claimed in claim 1 and including a wind turbine and a tower upon which said turbine is mounted, said turbine having a variable pitch propeller and a rotational mount upon which said turbine is mounted for rotational movement about a longitudinal axis of said tower.

24. A platform as claimed in claim 1 and including a wind turbine and a tower upon which said turbine is mounted, said turbine having a variable pitch propeller and a rotational mount upon which said turbine is mounted for rotational movement about a longitudinal axis of said tower including a turbine yaw detector for detecting the angular position of the turbine relative to said tower, said yaw detector being operably connected to said stability controller for supplying yaw data to said controller.

25. A platform as claimed in claim 24 including a yaw actuator for varying the yaw angle of the turbine relative to said tower, said yaw activator being operably connected to said stability controller for receiving actuation signals therefrom, thereby to vary the angular position of said wind turbine relative to said tower.

26. A platform as claimed in claim 1 including a wind monitor for monitoring the direction and velocity of any wind approaching said platform, said wind monitor being operably connected to said stabilization controller for supplying wind data thereto.

27. A platform as claimed in claim 23 including a pitch controller for controlling the pitch of said rotor blades, said pitch controller being operably connected to said stabilization controller for receiving control signals therefrom.

28. A platform as claimed in claim 1 and further including an anchor mechanism for anchoring said platform to an immovable object.

29. A platform as claimed in claim 28 wherein said anchor mechanism comprises three or more anchor lines secured at a first end to an immovable object and at an otherwise free end to a power generation apparatus.

30. A platform as claimed in claim 28 wherein said anchor mechanism comprises three or more anchor lines secured at a first end to an immovable object and at an otherwise free end to a power generation apparatus and said platform includes one or more cable tension monitors for monitoring the tension in one or more of said cables, said tension monitors being operably connected to said stabilization controller for supplying tension information thereto.

31. A platform as claimed in claim 28 wherein said anchor mechanism comprises three or more anchor lines secured at a first end to an immovable object and at an otherwise free end to a power generation apparatus and further includes one or more line length monitors for monitoring the length of one or more of said lines, said one or more line length monitors being operably connected to said stabilization controller for supplying length data thereto.

32. A control method for controlling a floatable platform having a platform base; one or more oscillating water columns; a displacement sensor for determining the axial displacement of said platform about one or more axes; a stabilisation controller; and an airflow control mechanism, for controlling the flow of air through the oscillating water column; the method comprising the steps of monitoring the axial displacement of said platform relative to one or more axes and controlling the flow of air through said oscillating water columns in response to detection of a deviation from a desired axial orientation of said platform, thereby to raise or lower a portion of said platform relative to the water upon which it is floating and at least reduce movement in one of more axis.

33. A control method as claimed in claim 32 wherein said airflow control mechanism comprises a flow control valve and said method includes the step of controlling the flow of air through said one or more columns so as to cause a portion of said platform to rise or fall relative to an adjacent portion thereof.

34. A control method as claimed in claim 32 and wherein the airflow control mechanism comprises an air driven turbine generator wherein control thereof comprises the steps of controlling the backpressure created thereby within the column.

35. A control method as claimed in claim 32 and wherein said airflow control mechanism comprises a flow control valve and an air driven turbine generator wherein said method includes the step of controlling the flow of air through said one or more columns and the backpressure created by the turbine so as to cause a portion of said platform to rise or fall relative to an adjacent portion thereof.

36. A control method as claimed in claim 32 and wherein said platform is provided with one or more horizontally extending water columns wherein said method further includes the step of controlling the flow of air through the water column for controlling the platform in one or more of sway or surge.

37. A control method as claimed in claim 32 and when said platform includes a wind turbine having a yaw control mechanism wherein said method includes the step of controlling one or more of the pitch and the yaw angle of the wind turbine blades so as to correct for yaw motion of the platform.

38. A control method as claimed in claim 32 and when said platform includes one or more cable anchors having power generators attached thereto wherein said method includes the step of controlling the paying in and paying out of said anchor lines thereby to control the platform in one or more of yaw, sway and surge.

39. A control method as claimed in claim 32 wherein said method includes the step of altering the pitch and/or excitation voltage of the air driven turbine within the oscillating water column in accordance with a given control methodology.

40. A control method as claimed in claim 32 wherein said method includes the step of altering one or more of the wind turbine rotor blade pitch and/or excitation voltage of the wind turbine generator in accordance with a given control methodology.

41. A method as claimed in claim 32 wherein said platform includes a computer having a software programme having a control algorithm and said method includes the step of controlling one or more of the air pressure within one or more oscillating water columns, the yaw and pitch angle of one or more blades of a wind turbine and/or the paying in and paying out of one or more anchor lines.

* * * * *